Dec. 11, 1962
G. WITT
3,068,316
CORD SHORTENING HOLDER
Filed June 12, 1959
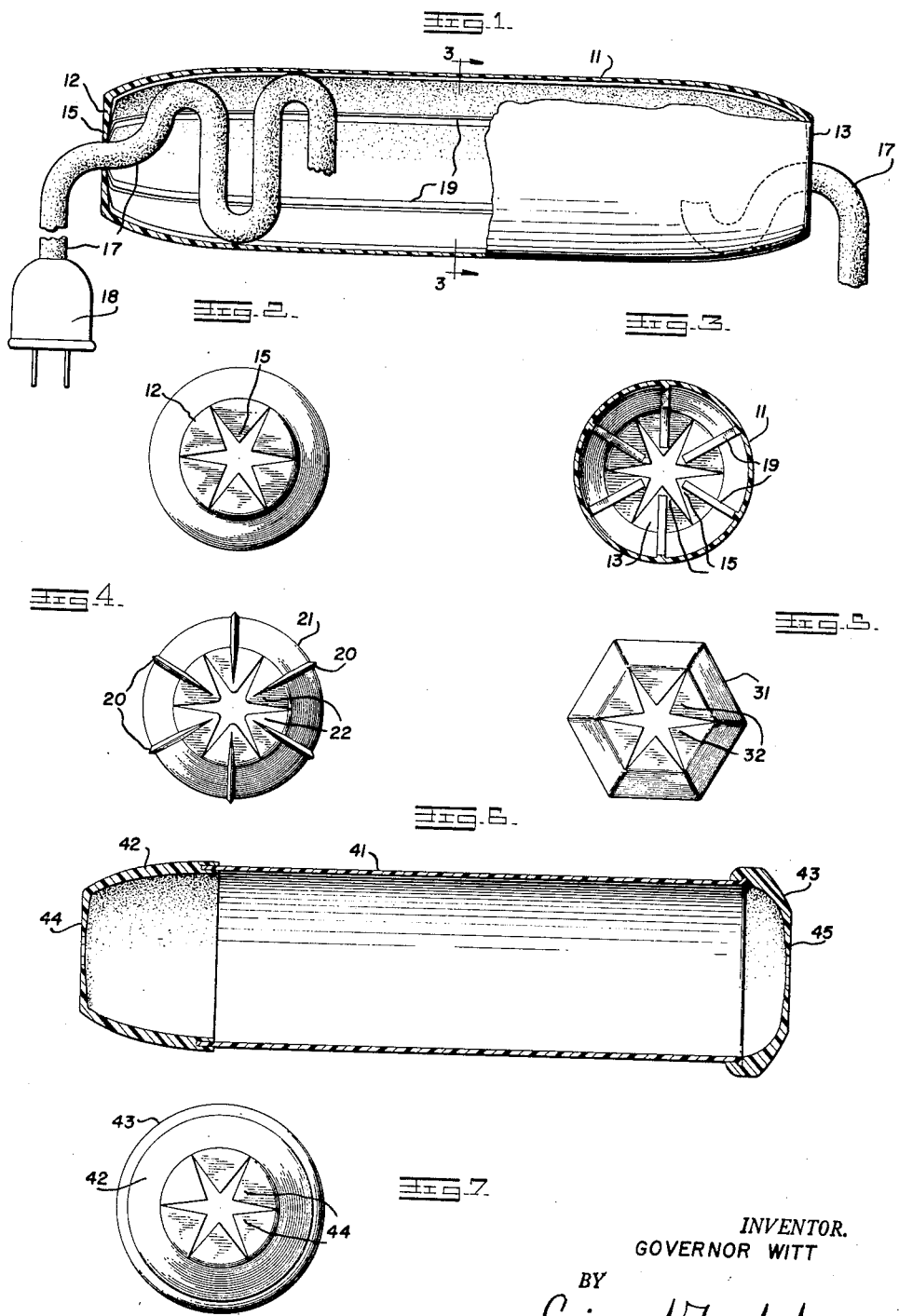
INVENTOR.
GOVERNOR WITT
BY
Craig and Freudenberg
ATTORNEYS United States Patent Office 3,068,316
Patented Dec. 11, 1962

3,068,316
CORD SHORTENING HOLDER
Governor Witt, 1076 N. Ocean Blvd., Palm Beach, Fla.
Filed June 12, 1959, Ser. No. 820,021
14 Claims. (Cl. 174—135)

This invention relates to holders for enclosing and protecting surplus lengths of flexible cords, particularly incremental lengths of electrical appliance cords folded together to shorten the total cord length such as between an appliance and an electrical plug on the opposite end of the cord.

Devices have been known for shortening electrical cords wherein the cords are wound upon a frame to reduce the overall cord length. In such known devices, not only is the wound portion of the cord exposed, but also the cord is usually secured so that only by an unwinding manipulation of the cord from the holder can the cord be extended if desired. Also, known cord shortening devices have what may be considered to be a disadvantage of being completely detachable from the cord when the cord is in its completely extended or maximum length position whereby the detached cord holder may be misplaced or lost, or at least requires special attention of the user to keep track of it or put it in a safe place.

It is an object of this invention to provide a cord holder that encloses a length of cord that is compacted for shortening the cord and which avoids what may be considered as undesirable characteristics of known devices.

Another object of this invention is to provide a cord holder for enclosing a surplus cord length and for gripping the cord at opposite ends of the surplus length to retain the surplus cord length therein.

A further object of this invention is to obtain a cord storage container for surplus lengths of cord wherein the cord may be placed by merely pushing it through an opening in the container and whereby, without special tying or other manipulations to secure the cord, the cord cannot be withdrawn under the pull of the mere weight of the container and the cord stored therein, but may be easily withdrawn to extend the cord by a manual pull. Since the cord may be easily withdrawn from the container by a mere pull, the device has an inherent safety aspect whereby a person inadvertently walking through a space across which the cord extends is less likely to be tripped by the cord since it will freely extend by pulling excess cord from the container or further the likelihood that such contact with the cord would displace an appliance connected thereto is considerably lessened.

Still another object of this invention is to provide an improved cord holder that may be secured to a cord that has an electrical plug on one end and an appliance or electrical receptacle on the other end, a more specific object being to make the holder inseparable from the cord without removing the electrical apparatus, such as a plug, from one end of the cord.

Another object of this invention is to provide an improved holder, as heretofore mentioned, which may be fabricated from inexpensive materials and preferably of one-piece construction.

Still another object of this invention is to provide an improved cord holder as heretofore and wherein the flexing of the cord as it is folded or coiled upon itself occurs or may occur without sharp bending of the cord.

In achieving the foregoing and other objects, this invention includes a generally elongated tubular shell enclosing only a single elongated essentially unobstructed storage space between its ends, the shell being preferably made of low cost material such as rubber or plastic and having openings at opposite ends at which are disposed radially inwardly directed resilient cord gripping members to at least partially close the openings. The resilient cord gripping members are preferably teeth arranged to frictionally engage the outer surface of a flexible cord or insulated electrical conductor passing therethrough and these teeth are distortable to facilitate insertion or withdrawal of surplus cord lengths into or from the interior of the tubular shell. The teeth are distortable or outwardly deflectable to an extent such that a plug or other enlargement of the cord may be passed through the opening at one or both ends of the tubular shell. Also, the shell may be so constructed that the outer generally tubular wall may be squeezed to cause deflection and separation of the teeth to facilitate the movement of a conductor through the opening defined therebetween.

While the invention preferably utilizes a tubular shell wherein the tube-like portion and the teeth are molded or otherwise formed integrally as a unit, the invention also extends to the use of a tube-like portion having attached to one or both ends thereof a separate closure portion or cap but where the cap is constructed with similar toothlike cord gripping portions.

The foregoing and other objects of the invention as well as the above description are intended to describe by way of example preferred embodiments of this invention and are not intended in any way to be limiting of the invention except as it is defined in the appended claims. For further explanation of features of the invention, reference may be had to the drawings, in which:

FIGURE 1 is a partially cut away longitudinal view illustrating a tubular holder for surplus cord lengths according to the present invention with a portion of a cord being shown;

FIGURE 2 is an end view of the holder illustrated in FIGURE 1, but omitting the cord;

FIGURE 3 is a section taken on line III—III of FIGURE 1, but omitting the cord;

FIGURE 4 is an end view of a modified form of the present invention utilizing longitudinal reinforcing ribs at the outside of the tubular holder;

FIGURE 5 is an end view of another modification of the present invention wherein the tubular holder is generally polygonal in cross section;

FIGURE 6 is a longitudinal section of still another embodiment of the present invention utilizing separable caps at opposite ends of a cylindrical housing; and FIGURE 7 is a view of the left end of the holder illustrated in FIGURE 6.

Referring to FIGURE 1 of the drawings, there is illustrated an elongated tubular shell 11, made of a resilient material such as rubber or a suitable plastic, having a generally cylindrical central portion and tapering slightly toward its opposite ends 12 and 13. The ends of the tubular shell 11 are at least partially closed by radially inwardly directed teeth 15 located in a plane generally transversely of the axis of the tubular shell 11. The teeth 15 are resilient and normally assume the radially inwardly directed position illustrated in the drawings to engage and frictionally grip a cord 17, but may be deflected from the aforementioned plane to facilitate the entry or removal of the cord 17 into or from the tubular shell 11.

The cord 17 is illustrated in FIGURE 1 as partially coiled or folded upon itself within the tubular housing 11 and may be provided at one end with the usual male plug 18, its other end being connected to another connecting device or electrical appliance (not shown). The transverse dimensions of the interior cord storage space are large relative to the cord diameter and the total length of cord which can be stored is many times greater than the length of the shell 11.

The teeth define an opening in each end of the tubular container 11, the openings being generally star-shaped as seen in FIGURE 2.

Preferably, the inner ends of the teeth 15 are disposed on a circle just slightly smaller than the diameter or maximum cross-sectional dimension of the cord with which the holder is to be utilized so that the tips of the teeth 15 will at all times frictionally engage the outer surface of the cord at at least three spaced points to resist slippage of the cord through the respective end opening of the holder. The teeth are separated by radially extending slits or cuts which permit the teeth to bend at all points along their length and even at base portions thereof disposed near the circumferential periphery of the ends 12 and 13 of the tubular shell 11. As seen in FIGURE 1, the teeth 15 have a slight taper radially inwardly, but may assume any configuration in section to give the desired characteristics of resiliency and flexibility. The inner ends or tips of the teeth may be pointed as seen in FIGURES 2 and 3 or they may be more blunt as in FIGURE 4 or even flat.

As seen in FIGURES 1 and 3, the tubular shell 11 is provided with longitudinally extending reinforcing ribs 19 which give the tubular shell 11 a desired semi-rigidity, but at the same time permit the shell to be squeezed near the opposite ends thereof whereby the teeth 15 may be caused to bend outwardly with their ends separated a greater distance than is shown to facilitate movement of the cord therebetween. The ribs 19 will assume a cross section necessary to impart the desired rigidity and may extend inwardly along the inner surface of the teeth, as seen in FIGURE 3, but may be at this point of smaller cross section whereby the teeth are somewhat more flexible than is the more rigidized tublar portion of shell 11.

The reinforcing ribs 19 illustrated in FIGURES 1 and 3 as being within the tubular shell whereby the latter may have a generally smooth outer ssurface, may also be replaced or supplemented by ribs 20 positioned longitudinally along the outer surface of the tubular shell 21 as seen in FIGURE 4. Here again, the configuration of the ribs may take any desired cross-sectional shape and the cross-sectional area may vary, particularly at the portion of the ribs which extends around the end of the holder and along the outer surface of the teeth 22, to give the desired degree of flexibility and resilience to the shell 21 and the teeth.

As seen in FIGURE 5, a cord holder may have a generally polygonal cross section, the shell 31 of this illustration being hexagonal with the six sides corresponding to the number of teeth 32 at each of the ends of the holder. With such an arrangement, the teeth 32 may be disposed with their bases defining a polygon or hexagon the sides of which are parallel to the sides of the main portion of the shell 31. Although reinforcing ribs, similar to ribs 19 or 20, may also be provided within the holder illustrated in FIGURE 5, the angular disposition of the respective sides will give certain rigidity to the tubular shell and accordingly reinforcing ribs may be omitted.

In each of the above-mentioned illustratons of FIGURES 1 through 5, the tubular shell is of one piece construction with the teeth at the opposite ends thereof formed integrally with the main shell portion. However, as illustrated in FIGURE 6, a main shell portion 41 may be constructed as a separate tube-like member with caps 42 and 43 detachably connected at one or both ends thereof and wherein both caps are provided with cord-gripping teeth 44 and 45, respectively, generally as described above.

In FIGURE 6, the main tube-like shell body 41 is generally cylindrical throughout its length but is provided at the right-hand end with a radially outwardly extending flange. This flange is used merely to help secure thereto the cap 43 having a complimentary recess and which may be of resilient material such as rubber or a suitable plastic to hold itself to the flange. The shell 41 is preferably of low cost plastic and may be substantially more rigid than the caps 42 and 43 since it may be formed of different material than the latter, possibly even of metal.

At the left end of the holder of FIGURE 6, the cap 42 is provided with an annular recess in the end thereof to receive the end of the cylindrical shell 41 which may be either frictionally secured thereto or otherwise fastened with any suitable bonding medium.

The cap 42 at the left end of the cord holder of FIGURE 6 may be somewhat longer than the cap 43, and this may be particularly preferably in the event that the main cylindrical body 41 is substantially more rigid than the cap structure. In this instance, the end opening bounded by the teeth 44 as seen in FIGURE 7 may be more readily distorted or enlarged to permit passage therethrough of a plug or other enlargement on the cord, which plug or enlargement has a maximum dimension greater than the maximum dimension of the opening as seen, for example, in FIGURE 7.

In utilizing any of the holders for surplus cord lengths in accordance with the hereindescribed invention, it is merely necessary to pass the cord axially through the holder so that it projects from opposite ends and thereafter the surplus length of the cord, which it is desired to store therein, may be pushed into one or both ends of the holder whereupon it will fold or coil upon itself therein at the relatively wide hollow space in the central part of the shell 11 as seen, for example, in FIGURE 1, and after the desired amount of cord is taken up within the holder, the cord will be frictionally gripped at the opposite ends of the holder so as to prevent or resist withdrawal of the surplus lengths therefrom, the friction being at least sufficient to prevent the weight of the holder and stored cord from pulling the cord from the holder when the cord is hanging, but may be easily withdrawn to extend the cord by a manual pull.

Whether the holder is made from one or more parts, each part is preferably a continuous ring about the cord passing therethrough so that no part of the holder can be separated from the cord without being slipped off the end thereof, and accordingly when any cord is in use, for example, with a plug plugged into an electrical receptacle and the other end connected to an appliance, it is impossible to remove the holder. It is also within the scope of this invention to utilize a holder as above described on a cord at the ends of which are plugs or other objects which are incapable of being passed through the holder whereby it is necessary to pass the cord through the holder before attaching the plug or the like thereto and in which case the holder becomes a permanent attachment to the cord.

While the bases of the teeth of each of the illustrated embodiments define a circle or polygon of smaller dimensions than the cross-sectional dimensions of the main tubular shell portion, the teeth may be extended radially outwardly so that their bases conform generally with the outer dimensions of the main body portion of the holder. In this instance, the main body portion may be substantially cylindrical or at least of similar cross section throughout its length.

It is to be understood that the reference hereinbefore to cord or electrical cord is to be construed as a generic term including cables, rope or other flexible structures capable of being shortened with the surplus or shortened portion being stored within the holder in the manner above described. While the tubular shell of the surplus cord length holder may be either rigid, semi-rigid or flexible, it is necessary in accordance with the present invention that the teeth remain resilient or distortable to permit the cord lengths to be passed through the cords of the housing and to be frictionally gripped thereat.

In order to give some idea of the size of the above-described cord holder, its length may be of the order of six inches and the maximum diameter at its midportion benig of the order of one and one-half inches, tapering possibly at the ends as seen in FIGURE 1 to approximately one inch. The wall and tooth thicknesses may be of the order of 1/32 to 1/16 inch depending upon the amount of flexiblity and resiliency required and the height of the reinforcing ribs which help to guide the cord when it is folded may be similarly dimensioned.

The foregoing examples and description of the invention are given merely by way of explanation of the invention and further modifications are possible, the invention being restricted solely by the scope of the following claims.

I claim:

1. A holder for containing surplus lengths of a flexible electrical cord or the like comprising an elongated tubular shell having an opening at each end and a circumferentially continuous transverse section, means at least partially closing the openings at the ends of said tubular shell and forming resilient teeth frictionally engageable with the outer surface of portions of said cord extending through the respective openings, said holder enclosing a single essentially completely unobstructed elongated hollow space between its ends for storing a portion of said cord folded upon itself, the shell and closing means being so constructed to provide access at all times both for insertion of cord portions into said hollow space merely by manually forcing said cord portions past said teeth and for removable of stored cord portions from said space merely by manually pulling them from said holder.

2. A storage device for surplus lengths of cord comprising a housing means having at opposite ends thereof apertures defined by a plurality of converging resilient teeth for engaging and frictionally holding a portion of said cord extending therethrough, the edges of each said aperture formed by said teeth defining a multi-pointed star, said housing means being so constructed to enclose only a single elongated unobstructed space between said ends and with respect to which said cord can be inserted thereinto or withdrawn therefrom only through said apertures, the tips of said teeth lying approximately in a circle the diameter of which is slightly less than the maximum cross-sectional dimension of said cord, said teeth having bases also generally circularly disposed, the circle of said bases being of smaller diameter than the transverse dimension of said holder at all points therealong between said ends.

3. A storage container for surplus lengths of cord or the like comprising an elongated tubular shell that is generally symmetrical about a longitudinal axis and providing a single elongated unobstructed enclosed cord storage space between the ends of said container, said container having closure portions defining the ends of said space and secured to said shell, said shell being circumferentially continuous at substantially all transverse sections along said axis between said closure portions, a continuous cord entering said container through an aperture at one of said closure portions and leaving the container at a point near the opposite end thereof, said one closure portion having resilient means gripping the outer periphery of said cord at said aperture, the shell and closure portions of said container being so constructed to provide access at all times both for insertion of cord portions into said space merely by manually forcing them past said resilient means and for removal of stored cord portions merely by manually pulling them through said aperture.

4. A storage device for surplus lengths of a flexible cord comprising a main hollow body portion circumferentially continuous in cross section and having secured thereto apertured end wall members through which said cord may extend outwardly in opposite directions from said device, said end wall members each having resilient means defining an aperture through which said cord may pass, said hollow body portion together with said end wall members defining only a single elongated hollow space between said end wall members for cord storage, each said resilient means being so constructed as to frictionally engage a cord in said aperture at spaced points to frictionally resist movement of the cord therethrough, the resilient means at each said aperture being so constructed to provide access at all times both for insertion of cord portions into said hollow body portion merely by manually forcing them past said resilient means and for removal of stored cord portions from said hollow body portion merely by manually pulling them therefrom, each said aperture being of relatively small dimensions with respect to the transverse interior dimensions of said body portion between said ends whereby the cord may fall upon itself after insertion into said body portion through at least one of said apertures so that a length of cord that may be many times longer than the maximum dimension of said body may be stored therein.

5. A cord storage device according to claim 4, wherein at least one of said end wall members is formed by a cap detachably secured to said body portion.

6. A cord storage device according to claim 4, wherein each said resilient means is an integral portion of the respective end wall member, the resiliency being provided by the inherent resiliency of the material thereof.

7. A cord storage device according to claim 4, wherein said hollow body portion is relatively rigid and at least one of the end wall members secured thereto is made of resilient flexible material.

8. A cord storage device according to claim 4, wherein each said aperture for passing said cord is defined by a plurality of converging teeth.

9. A cord storage device according to claim 4, wherein each said aperture for passing said cord is defined by a plurality of radially inwardly extending and substantially co-planar teeth.

10. A cord storage device according to claim 4, wherein said main hollow body portion is elongated and includes longitudinally extending reinforcing ribs at a plurality of points spaced around its longitudinal axis.

11. A cord storage device according to claim 10, wherein said longitudinal ribs are located on the exterior surface of said hollow body portion.

12. A cord storage device according to claim 10, wherein said longitudinal ribs are located on the interior surface of said hollow body portion.

13. A cord storage device according to claim 10, wherein the resilient means of said end wall members extend radially inwardly from the ends of said main hollow body portion and include inwardly extending end portions of said longitudinally extending ribs.

14. A storage container for surplus lengths of electrical cords comprising an elongated tubular shell having a circumferentially continuous transverse section, said container having closure portions defining with said shell between said closure portions only a single elongated essentially unobstructed enclosed cord storage space, an electrical cord including one part entering said container through an aperture at one of said closure portions and having a further electrically conducting means leaving the container at a point near the opposing end thereof, said cord extending through said circumferentially continuous transverse section and having a surplus length thereof folded upon itself within said storage space, said one closure portion comprising resilient teeth gripping the outer periphery of said cord at said aperture, said shell and closure portions being so constructed to provide access at all times both for insertion of cord portions into said space merely by manually forcing them past said resilient teeth and for removal of stored cord portions merely by manually pulling them from said space through said aperture.

References Cited in the file of this patent

UNITED STATES PATENTS

| | | |
|---|---|---|
| 2,052,341 | Douglass | Aug. 25, 1936 |
| 2,118,731 | Knott | May 24, 1938 |
| 2,160,961 | Dorman | June 6, 1939 |
| 2,364,262 | Wehringer | Dec. 5, 1944 |
| 2,514,542 | Guest | July 11, 1950 |
| 2,934,591 | Tiikkainen | Apr. 26, 1960 |